United States Patent
Gutiérrez et al.

(10) Patent No.: US 10,400,308 B2
(45) Date of Patent: Sep. 3, 2019

(54) PROCESS FOR THE IMPROVEMENT OF COPPER LEACHING PROCESSES USING CALCIUM CHLORIDE

(71) Applicant: Antofagasta Minerals S.A., Santiago (CL)

(72) Inventors: Abraham Backit Gutiérrez, Melipilla (CL); Gustavo Tapia Cortés, Santiago (CL)

(73) Assignee: Antofagasta Minerals S.A., Santiago (CL)

(*) Notice: Subject to any disclaimer, the term of this patent is extended or adjusted under 35 U.S.C. 154(b) by 333 days.

(21) Appl. No.: 15/239,666

(22) Filed: Aug. 17, 2016

(65) Prior Publication Data
US 2017/0335428 A1    Nov. 23, 2017

(30) Foreign Application Priority Data
May 19, 2016 (CL) .................... 1188-2016

(51) Int. Cl.
| C22B 15/00 | (2006.01) |
| C22B 3/26 | (2006.01) |
| C22B 1/16 | (2006.01) |
| C22B 3/08 | (2006.01) |
| C22B 3/22 | (2006.01) |
| C22B 3/44 | (2006.01) |

(52) U.S. Cl.
CPC .......... *C22B 15/0071* (2013.01); *C22B 1/16* (2013.01); *C22B 3/0005* (2013.01); *C22B 3/08* (2013.01); *C22B 3/22* (2013.01); *C22B 3/44* (2013.01); *C22B 15/0008* (2013.01); *C22B 15/0086* (2013.01); *C22B 15/0089* (2013.01); *Y02P 10/234* (2015.11); *Y02P 10/236* (2015.11)

(58) Field of Classification Search
CPC ... C22B 15/0071; C22B 15/0089; C22B 3/44; C22B 3/22; C22B 3/08; C22B 15/0086; C22B 1/16; C22B 15/0008; C22B 3/0005; Y02P 10/236; Y02P 10/234
See application file for complete search history.

(56) References Cited

U.S. PATENT DOCUMENTS

| 6,802,888 | B2 * | 10/2004 | Kohr | .................... C22B 3/18 423/27 |
| 6,926,753 | B2 * | 8/2005 | Faine | .................... C22B 1/243 75/712 |
| 7,491,372 | B2 * | 2/2009 | Faine | .................... C22B 15/0008 423/26 |
| 2004/0144209 | A1 * | 7/2004 | Faine | .................... C22B 1/243 75/743 |
| 2009/0173188 | A1 * | 7/2009 | Muller | .................... C22B 3/045 75/743 |

FOREIGN PATENT DOCUMENTS

CL                40891        *  5/1997

* cited by examiner

*Primary Examiner* — Anthony J Zimmer
(74) *Attorney, Agent, or Firm* — Holland & Hart, LLP (57) ABSTRACT

A process to significantly improve the copper chemical leaching process for primary and secondary minerals, using calcium chloride including the agglomeration, curing, and leaching with a high content of chloride, iron and copper stages. The mineral is then washed with a low concentration of copper and a high concentration of acid, where the impregnated copper is extracted from the pit and wherein a recirculated solution is used in the agglomeration stage.

16 Claims, 6 Drawing Sheets

Figure 1

Prior Art

PROCESS FOR THE IMPROVEMENT OF COPPER LEACHING PROCESSES USING CALCIUM CHLORIDE

RELATED APPLICATIONS

Pursuant to 35 U.S.C. § 119 and the Paris Convention Treaty, this application claims the benefit of Chilean Patent Application No. 1188-2016 having a priority date of May 19, 2016 entitled "Process for the improvement of the copper leaching processes using calcium chloride," the contents of which, are incorporated herein by reference in its entirety.

TECHNICAL FIELD

The invention is developed in the field of the chemical leaching of copper minerals, both primary and secondary sulfides. More specifically, it refers to a process for the improvement of the copper leaching processes using calcium chloride.

DESCRIPTION OF THE PRIOR ART

As a close prior art document, patent application CL 1411-1996 (Chilean patent No 40,891) refers to a process for agglomerating finely crushed copper minerals, forming stacks with liquid permeability under trickle leaching, higher than 200 Darcy and gaseous permeability under trickle leaching, higher than 1,000 Darcy.

In the agglomeration stage, a first solution containing calcium chloride and a second solution containing sulfide ion, and the water used in the agglomeration where the calcium chloride is dissolved are added. The water may be pure, industrial water, saline water, or leaching solutions then forming a stack with the agglomerated material. This material is allowed to rest during certain amount of time, the stack is leached with a leaching solution, and then is washed with pure water, industrial water, sea water, saline water, or refined water.

Figure 1:
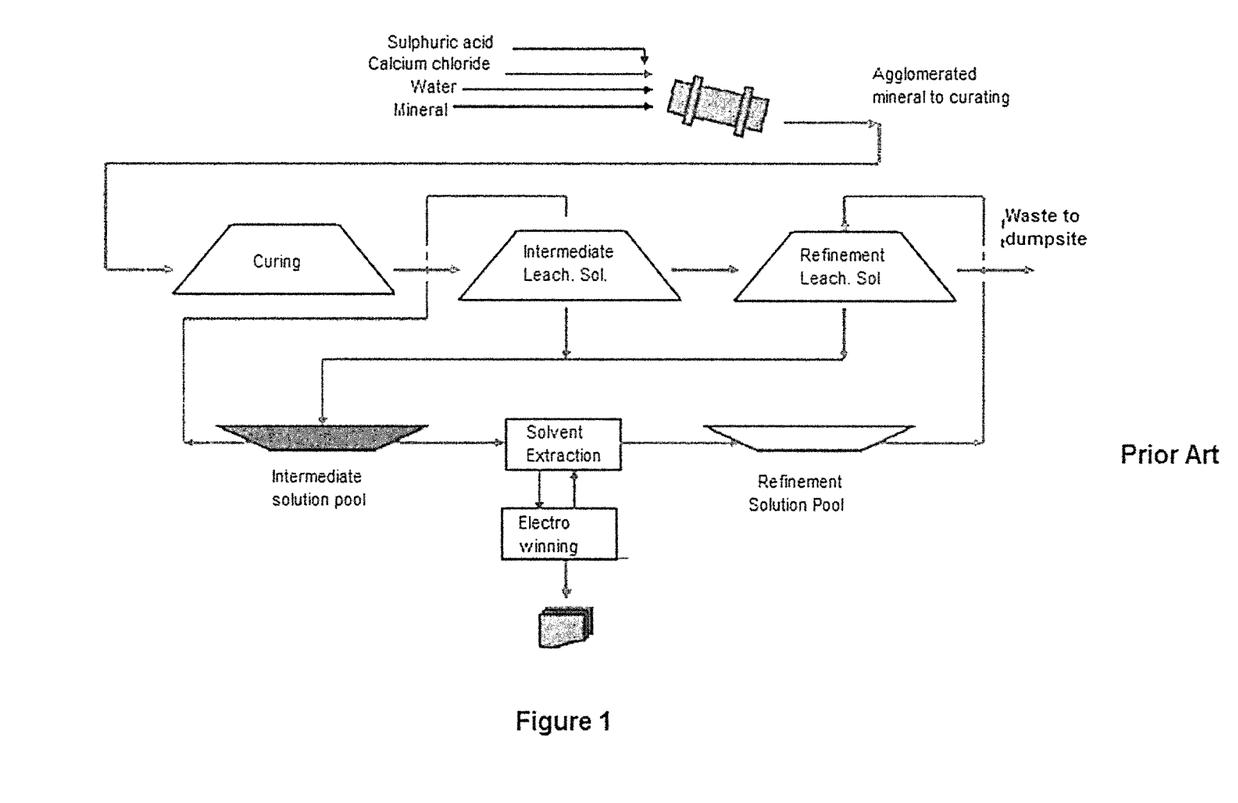
FIG. 1 shows the process industrially used by Minera Michilla (prior art).

The above mentioned industrial use process is comprised by the agglomeration stage-curing, leaching with a high content of chloride, iron and copper solution, wherein finally the mineral is washed with a solution with a low concentration of copper and a high concentration of acid (see FIG. 1). The solvent extraction stages and the electrowinning are not comprised in patent No CL 40,891.

The novel characteristic of the disclosed invention is the addition of calcium chloride ($CaCl_2$) in the agglomeration stage, wherein 2 to 25 kg per ton of dry mineral of this compound are added. This addition has two goals, first, to form a solid bridge between the fine and thick particles by the generation of plaster ($CaSO_4 \cdot 2H_2O$) according to the reaction:

$$CaCl_2 + H_2SO_4 + 2H_2O = CaSO_4 \cdot 2H_2O + 2H^+ + 2Cl^- \quad (1)$$

The second goal is to provide the chloride anion, needed for the reactions of regeneration of oxidant agents in the process.

Leaching reactions start in the curating stage, when the sulfuric acid dissolves part of the soluble copper and iron from the mineral.

$$Mineral + H_2SO_4 = Fe^{3+} + H_2O + SO_4^{2-} \quad (2)$$

$$CuO + H_2SO_4 = Cu^{2+} + SO_4^{2-} + H_2O \quad (3)$$

From reaction (2) the ferric ion starts dissolving the chalcocite and the covelline according to the reactions:

$$Cu_2S + 2Fe^{3+} = Cu^{2+} + CuS + 2Fe^{2+} \quad [1]$$

$$CuS + 2Fe^{3+} = Cu^{2+} + 2Fe^{2+} + S \quad [2]$$

In a regular leaching process, reactions [1] and [2] are stopped when the ferric ion dissolved from the mineral runs out; however, when adding the chloride ion (Cl−) to the agglomerate from the calcium chloride, the presence of the cuprous ion ($Cu^+$) is, and this in turn allows the regeneration of the ferric ion through the chemical equilibrium shown in reaction [3];

$$Cu^{+2} + Fe^{2+} = Cu^+ + Fe^{3+} \quad [3]$$

This reaction is favored by the chloride concentration increase in the agglomeration stage, i.e., the more chloride in the agglomeration more ferric ion and more cuprous ion are formed.

At the same time, the cuprous ion reacts quickly in contact with oxygen and is oxidized to the cupric ion according to reaction [4];

$$2Cu^+ + \tfrac{1}{2}O_2 + 2H^+ = 2Cu^{2+} + H_2O \quad [4]$$

Through these two reactions, the ferric ion continues the dissolution of the copper sulfurized copper species.

Once the mineral ends the curating process (rest time wherein the first chemical reactions previously mentioned are carried out), the mineral is leached with a solution called intermediated leaching solution (recirculated solution) or ILS by its acronym in English. ILS solution (recirculated solution) has the following characteristics:
  i. CuT=0.2 to 5 [g/L],
  ii. FeT=8 to 16 [g/L],
  iii. Cl−=30 and 130 [g/L],
wherein CuT represents total copper, FeT represents total iron and Cl− or the concentration of chloride ion present in the solution. The leaching period with ILS (recirculated solution) is between 10 and 100 days.

Copper in solution is extracted by means of the conventional solvent extraction and electrowinning techniques. Finally, the mineral is irrigated with a refinement solution having a low copper content and a high sulphuric acid content.

The previously described process, protected by patent No CL 40,891, allows leaching the copper from secondary minerals (covellite, chalcocite y partially from bornite), but is inefficient to extract the copper primary minerals (chalcopyrite and bornite). Chalcopyrite leaching in minerals has been deeply studied. Mostly, these studies are based in bioleaching processes (leaching assisted by bacteria) and in a much smaller way, through leaching by chemical means, all of these with quite modest results.

Another close prior art document is Chilean patent application 574-2012, which discloses a method to leach copper and gold from sulphurated mineral, in which during a first stage a leaching solution containing chloride ion, copper ion, and ferric ion is used under an oxidizing agent from which a leaching residue is obtained, which is leached with a second solution containing chloride ion, bromide ion, copper ion and ferric ion under an oxidizing agent as to recover the gold from the leaching residue.

Chilean patent No 48,695 can also be mentioned, as it discloses a process to recover copper from a material, in an electrochemical cell, containing at least bornite, copper glance, chalcopyrite, covellite, or enargite, to passivation. The described process comprises leaching the mineral into a pulp of hydrochloric acid or a mixed pulp of chloride/sulphate, in presence of dissolved oxygen and cupric ions, maintaining the potential of the mineral surface in a range of 550 mV to 600 mV.

Another prior art document that can be mentioned is Chilean patent No 45,163 disclosing a process to leach copper concentrates in a stack of pebbles, wherein: the copper concentrates is artificially added to the surface of a solid material useful to support it, which can be an artificial material or stony substance, forming an agglutinate; the agglutinated material is collected in a field forming a leaching stack; is irrigated with a leaching solution containing between 0.5 and 10 g/L de $Cu^{2+}$, 50 to 120 g/L of $Cl^-$ y 5 to 25 g/L of acid concentration, expressed as sulphuric acid.

Finally, Chilean patent application 395-2015 can be mention, which disclosed a copper extraction process from copper sulphide minerals, in which the solution potential was improved to higher than 700 mV SHE, in absence of any microorganism, putting them in contact with the minerals in a pre-treatment phase with an acid solution having a high content of chloride and having dissolved copper.

None of the previously referenced documents disclosed the processes characterizing the present invention, i.e., addition of a recirculated solution in the agglomeration process; addition of heat to the primary sulphur mineral and/or the solution in the curing stage with a temperature higher than 30° C.; addition of heat to the mineral or heating the solution in the leaching stage in pit with solution containing recirculated solution, a temperature higher than 30° C.; and the washing with a refinement solution at a temperature higher than 30° C.

SUMMARY OF THE INVENTION

This invention discloses a process to significantly improve the copper chemical leaching process for primary and secondary minerals, using calcium chloride comprised by the agglomeration, curing, leaching with a high content of chloride, iron and copper stages. Finally, the mineral is washed with a low concentration of copper and a high concentration of acid, where the impregnated copper is extracted from the pit and wherein recirculated solution is used in the agglomeration stage. In addition, temperature is also used in the curing and leaching stages, adding heat to the mineral by heating the leaching solutions and/or adding hot air to the stack, wherein the temperature is higher than 30° C. and lower than 60° C.

DETAILED DESCRIPTION OF THE INVENTION

Figure 2:
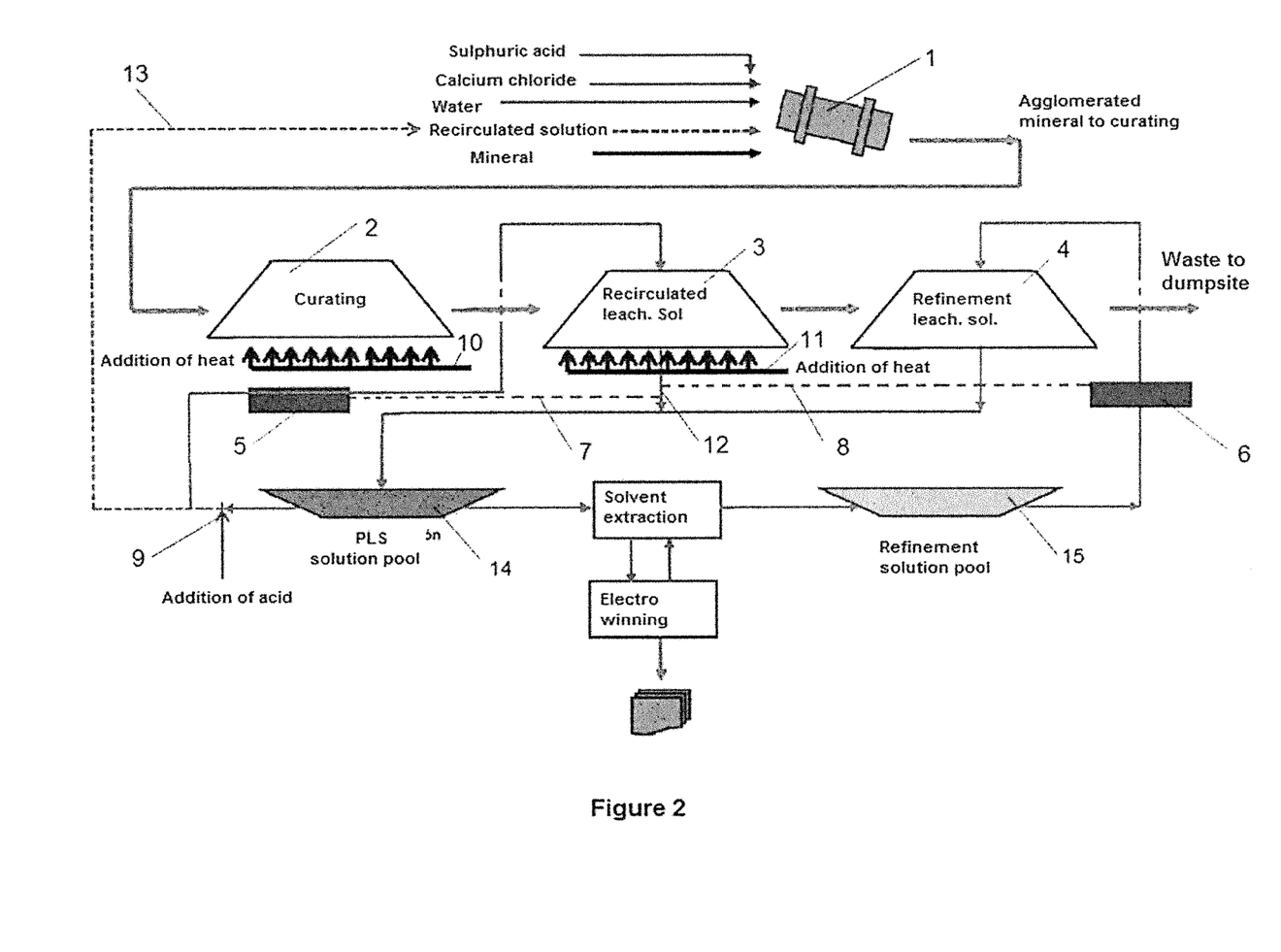
FIG. 2 shows the process of the invention, using intermediate solution in the agglomerate, and temperature in the curing, leaching and washing.

As shown in FIG. 2, a process using calcium chloride or primary and secondary crushed copper minerals with a particle size from about 80% under 12 mm to about 80% under 3 mm is described. The selection of the particle size is a function between the recovery goal and the cost of crushing. The new process presented herein, uses recirculated solution obtained from the resulting solutions from leaching (3) and washing (4) which are extracted from a pool (14). This process has four novel process allowing improvements in the copper recovery:

Addition of Recirculated Solution in the Agglomeration Process (1)—

This process considers adding during the agglomeration stage (1) the recirculated solution, which is carried through a line (13) for this purpose, using primary and secondary copper minerals. This process has two advantages: The first one, is that the recirculated solution already has the chemical agents needed for the dissolution of the sulphurated copper species ($Fe^{3+}$, $Fe^{2+}$, $Cu^{2+}$ y $Cl^-$) which implies a kinetic advantage in the curing stage, as the copper and ferric ion needed are delivered to start the leaching reactions of the primary and secondary copper mineral.

The second advantage is that the recirculated solution has a higher concentration of chloride ion (30 to 130 g/L) compared to the 21 g/L from sea water, which implies that for the same amount of agglomeration solution the contribution of chloride ion is higher, which is needed for the ferric ion regeneration reactions. The agglomeration solution is a combination of sea water, saline or another type of water, or leaching solution added at a rate of 1 to 40 L/ton of dry mineral with recirculated solution added to the agglomeration drum, at a rate of 25 to 100 L/ton of dry mineral and the addition of sulphuric acid according to the consumption obtained in laboratory processes, typically between a 50 to 80% of the total. The recirculated solution contains a total copper concentration of 0.2 to 5.0 g/L, a ferrous ion concentration of 1.0 to 10 g/L, a ferric ion concentration of 1.0 to 10.0 g/L, and a sulfuric acid concentration of 2.0 to 10.0 g/L.

The resulting agglomerate has a humidity between 6 and 12% when exiting the agglomeration drum (1), depending on the mineral characteristics. Additionally, in the agglomeration process the recirculated solution is at a temperature higher than 30° C. and lower than 60° C.

Addition of Heat (10) to the Primary Sulphur Mineral and/or the Solution in the Curing Stage (2) with a Temperature Higher than 30° C. and Lower than 60° C.—

After the agglomeration process, the mix of sea water, saline or another type of water, calcium chloride, sulphuric acid and recirculated solution fed at higher temperatures than 30° C. form a solution reaching maximum temperature values of 70° C. to 85° C. depending on the material composition. The formed solution reaches chloride ion concentrations of 140 to 365 g/L and ensures the stability of the cuprous ion in solution in boundary layer.

This step is performed by heating the bed (10) and/or the solution according the methods available in the market, such as water jackets, electric heaters, hot air, solar radiation or any other method that allows to maintain a mineral temperature higher than 30° C. and lower than 60° C. The curing time is higher than 3 days and preferably higher than 7 days.

Addition of Heat to the Mineral (11) or Heating of the Solutions (5) in the Leaching Stage (3) in Stacks with Solution Containing Recirculated Solution at a Higher Temperature than 30° C. and Lower than 60° C.—

After the previous curing process, follows this process, which with the addition of calcium chloride ($CaCl_2$) during the agglomeration (1) is efficient for the leaching of primary and secondary copper minerals. A form to significantly increase the copper extraction with high contents of chalcopyrite is by adding heat to the system.

In this case, heat is added to the mineral by heating the leaching solutions (5) and/or adding hot air (11). This, in addition to the leaching of pyrite, would generate enough heat to increase the chalcopyrite leaching speed. The heat produced in this stage is due to an exothermic reaction during the leaching of the pyrite. The amount of heat generated depends of the mineralogical composition of the ore. The recirculated solution for irrigation of the stack, gets in at a temperature higher than 30° C. and lower than 60° C., heated by heat exchange (5) with the rich solution (PLS) at the exit of the stack, transported by pipes (7). The irrigation effective period for secondary sulphurs is lower than 80 days and for primary sulphurs, lower than 300 days.

Washed of Stacks with Refinement Solution from the Prior Leaching in Pit Process—

The irrigation refinement solution for the pit previously treated with recirculated solution and previously heated at temperatures higher than 30° C. and lower than 60° C., after passing through the solvent extraction process also enters the pit (4) as refinement solution at a temperature higher than 30° C. and lower than 60° C., heated by heat exchange (6) operating with the PLS solution at the pit exit (12) transported by pipes (8). The refinement solution for this process is extracted from a refinement solution pool (15) at the exit of the solvent extraction exit.

EXAMPLES

Experimental Stage (I)

Figure 6:
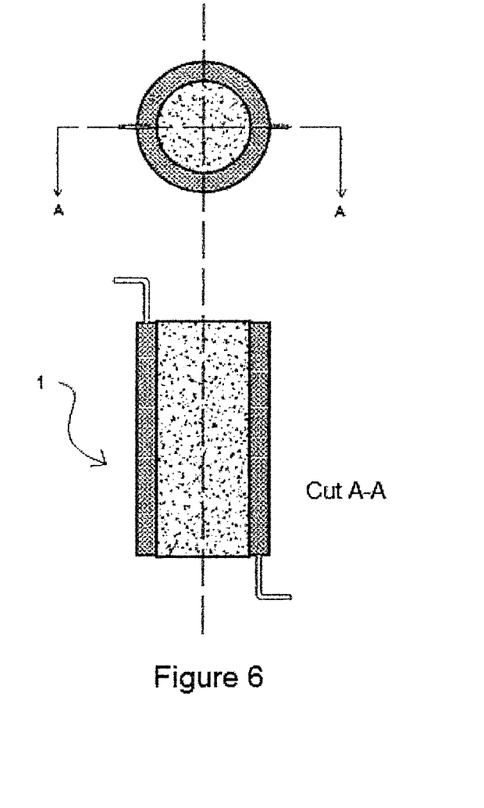
FIG. 6 show a leaching column with a water jacket to perform the leaching experiment with temperature of the chalcopyrite minerals.

These experimental test were performed in leaching columns (1), (see FIG. 6) one meter tall, with a tubular shape, where the mineral with 0.632% of total copper content, with a 95% content of chalcopyrite is heated, obtaining the following results with a crushed sample 100% under 12 mm:

TABLE 1

| Copper recovery with and without temperature with CuT = 0.632%. | | | |
|---|---|---|---|
| Leaching without temperature Time [days] | CuT = 0.632% CuT Extraction (accumulated) [%] | Leaching with temperature Time [days] | CuT = 0.632% CuT extraction (Accumulated) [%] |
| 0 | 0.0 | 0 | 0.0 |
| 1 | 1.6 | 1 | 15.1 |
| 2 | 2.4 | 2 | 16.5 |
| 3 | 2.6 | 3 | 17.8 |
| 4 | 2.8 | 4 | 18.3 |
| 5 | 2.9 | 5 | 18.5 |
| 6 | 3.1 | 6 | 19.4 |
| 12 | 4.1 | 12 | 25.2 |
| 19 | 5.2 | 19 | 30.7 |
| 26 | 6.2 | 26 | 34.4 |
| 33 | 7.1 | 33 | 35.6 |
| 39 | 7.9 | 39 | 40.0 |
| 48 | 8.9 | 48 | 42.3 |
| 54 | 9.6 | 54 | 44.1 |
| 61 | 8.4 | 61 | 45.6 |
| 68 | 9.1 | 68 | 45.5 |
| 75 | 9.7 | 75 | 47.6 |
| 82 | 10.3 | 82 | 50.3 |
| 89 | 10.8 | 89 | 51.8 |
| 96 | 11.3 | 96 | 52.0 |
| 103 | 11.8 | 103 | 53.1 |
| 110 | 12.2 | 110 | 54.7 |
| 117 | 12.6 | 117 | 55.3 |
| 124 | 13.0 | 124 | 59.1 |
| 131 | 13.3 | 131 | 57.0 |
| 138 | 13.7 | 138 | 57.2 |
| 145 | 14.0 | 145 | 58.2 |
| 152 | 14.3 | 152 | 57.9 |
| 159 | 14.5 | 159 | 62.0 |
| 166 | 14.8 | 166 | 61.0 |
| 173 | 15.0 | 173 | 60.2 |
| 180 | 15.2 | 180 | 60.4 |
| 187 | 15.4 | 187 | 60.4 |
| 194 | 24.1 | 194 | 72.4 |
| 201 | 28.7 | 201 | 75.3 |
| 205 | 28.8 | 205 | 75.4 |

Figure 3:
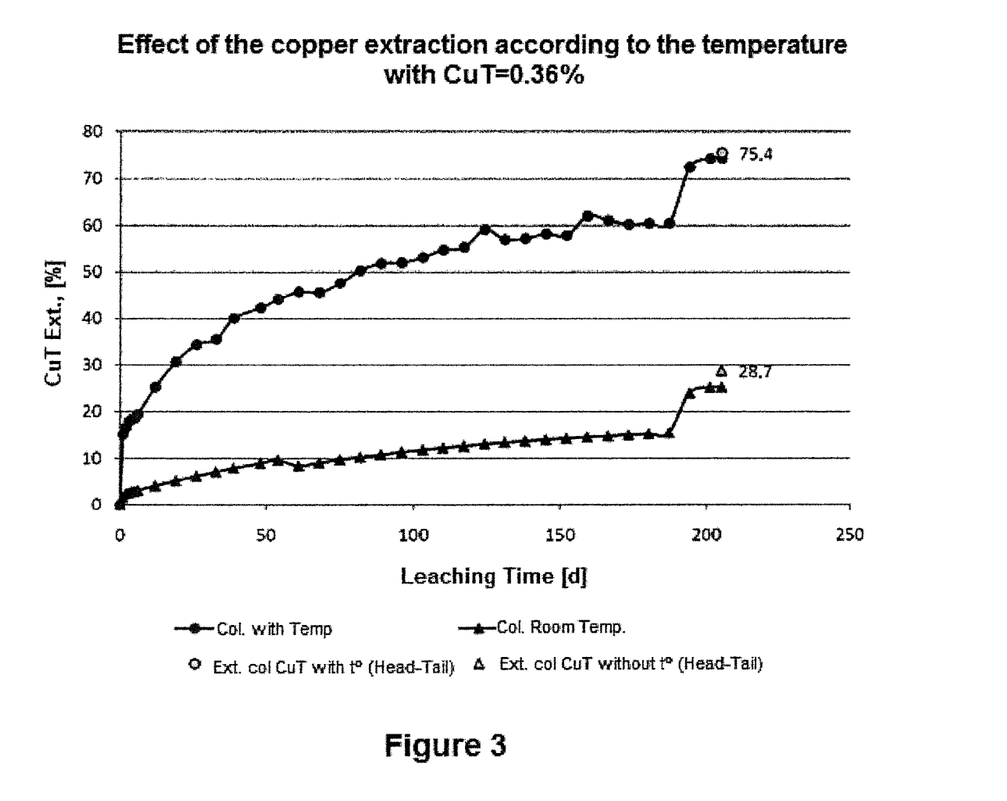
FIG. 3 shows a graphic of the effect of the copper extraction for chalcopyrite mineral according to the temperature with a total copper content (CuT) in the mineral of 0.632%.

This data corresponds to the graphic in FIG. 3.

A second experience was performed contributing heat to the leaching column, this time using a mineral with 0.36% of CuT, with chalcopyrite contents over 90%, obtaining the following values for crushed samples 100% under 12 mm:

TABLE 2

| Results of the leaching process using temperature. | |
|---|---|
| Leaching with temperature Time Days | CuT = 0.36% CuT extraction Accum. of Cu Ext. [%] |
| 0 | 0 |
| 60 | 35.65 |
| 124 | 45.5 |
| 166 | 50.1 |

Figure 4:
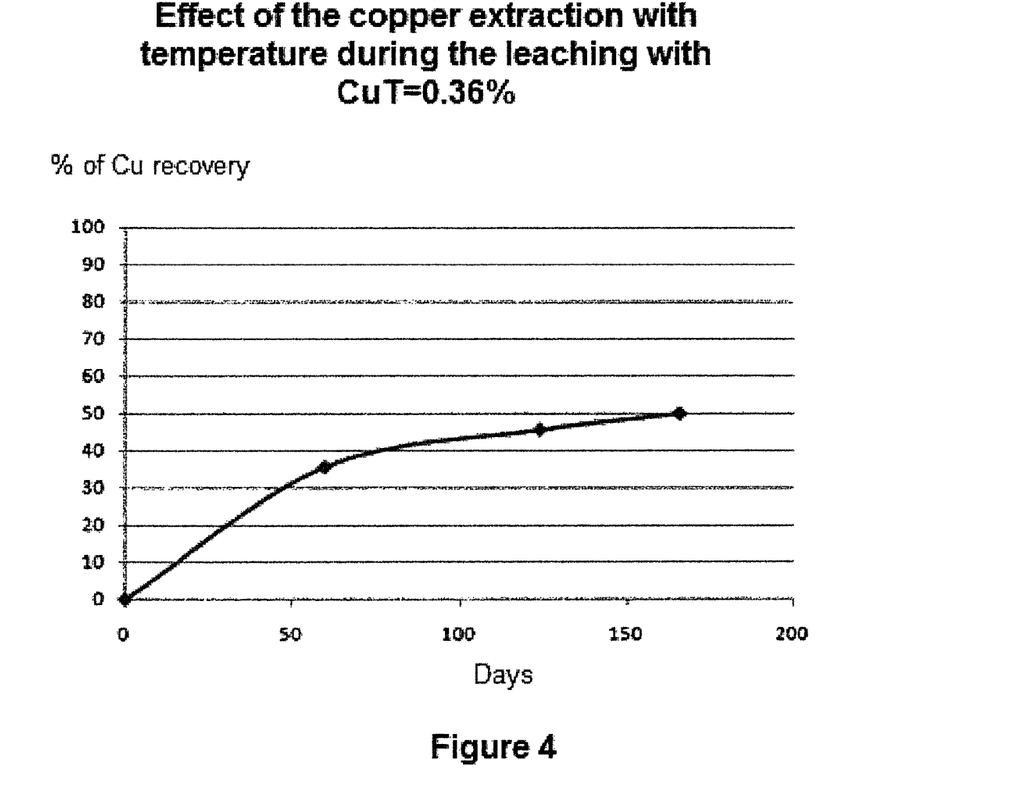
FIG. 4 shows a graphic of the effect of the copper extraction for chalcopyrite mineral with temperature and a total copper content (CuT) in the mineral of 0.36%.

This data corresponds to the graphic in FIG. 4.

According to these results, it can be appreciated that a higher recovery is obtained using temperature in the leaching process indicated.

The final recovery depends mainly of the copper release and the $CaCl_2$ effect on the agglomerate quality allows treating in rolls of pressure up to less than 2 mm.

Experimental Stage (II)

The experimental results simulating the agglomeration and curing stages show that the minerals to which ILS (recirculated solution) was incorporated, have a better copper extraction, which means downstream (leaching process with solution) an improvement in the copper extraction kinetics, i.e., the same amount of copper can be obtained in less time.

Figure 5:
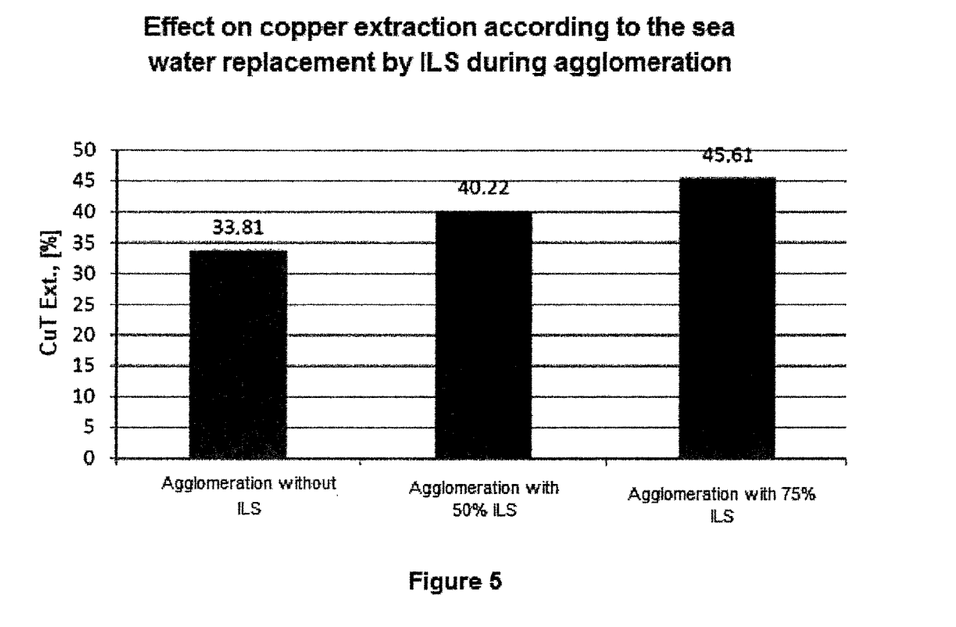
FIG. 5 show a graphic of the effect in the copper extraction for primary sulphurs by adding recirculated solution to the agglomeration.

FIG. 5 shows scanning experiments where different concentrations were used in the curing stage, which were performed to a mineral coming from Estefania mine from Minera Michilla, with a total amount of copper of 1.69% and soluble copper of 0.69%. Additionally, it can be observed in FIG. 5 that in the case of the process without ILS (recirculated solution), a 34% or total copper recovery was obtained. However, when the extraction was performed in the agglomeration process, the copper recovery increased with the addition of a 50% of ILS solution (recirculated solution) or with a 75% of ILS solution (recirculated solution), wherein a total copper recovery of 40% and 46% was obtained, respectively.

Minerals were agglomerated with the following dose of compounds:

TABLE 3 dose of the compounds for the agglomeration

| | Agglomeration | | | | |
|---|---|---|---|---|---|
| | $H_2SO_4$ | $CaCl_2$ | $H_2O$ | ILS Sol. (recirculated solution) | CURED |
| Target | 25 [kg/t] | 4 [kg/t] | 65 [L/t] | 0 [L/t] | 10 DAYS |
| 50% of water replaced with ILS (recirculated solution) | 25 [kg/t] | 4 [kg/t] | 32.5 [L/t] | 32.5 [L/t] | |
| 75% of water replaced with ILS (recirculated solution) | 25 [kg/t] | 4 [kg/t] | 16.25 [L/t] | 48.75 [L/t] | |

The re-circulated leaching solution used has the following characteristics:

TABLE 4 dose of the compounds in the ILS (recirculated solution)

| Compound | Dosage |
|---|---|
| $Cu^{2+}$ | 0.5 to 4 [g/L] |
| $Fe^{2+}$ | 2 to 5 [g/L] |
| $Fe3+$ | 2 to 5 [g/L] |
| $H_2SO_4$ | 2 to 6 [g/L] |
| $Cl^-$ | 70 to 80 [g/L] |

The invention claimed is:

1. A process of leaching of primary and secondary crushed copper minerals with a particle size between 80% under 12 mm to 80% under 3 mm wherein it is used to leach copper sulphurated minerals having a primary and/or secondary copper mineralization as chalcopyrite, bornite and covellite, wherein the process comprises:
   agglomerating an agglomeration solution in a combination of sea water, saline or water with a recirculated solution;
   curing in a pit after agglomerating in which the mix of sea water, saline or water, along with calcium chloride, sulphuric acid and/or the recirculated solution is fed at temperatures higher than 30 degrees Celsius and lower than 60 degrees Celsius;
   leaching in the pit containing recirculated solution after curing in which the recirculated solution for irrigation of a stack gets in at a temperature higher than 30 degrees Celsius and lower than 60 degrees Celsius;
   washing with refinement solution after leaching in the pit, wherein the refinement solution for irrigation of the previously treated pit with recirculated solution and previously heated at temperatures higher than 30 degrees Celsius, after going through a solvent extraction process also enters the stack as refinement solution at a temperature higher than 30 degrees Celsius and lower than 60 degrees Celsius;
   wherein during leaching the recirculated solution is heated at a temperature higher than 30 degrees Celsius and lower than 60 degrees Celsius by heat exchange.

2. A process according to claim 1, wherein during agglomerating the agglomeration solution is added at a rate of 1 to 40 L/ton of dry mineral with recirculated solution, added to an agglomeration drum at a rate of 25.0 to 100.0 L/ton of dry mineral and sulphuric acid between 50-80% of the total.

3. A process according to claim 1, wherein during agglomerating the recirculated solution is at a temperature higher than 30 degrees Celsius and lower than 60 degrees Celsius.

4. A process according to claim 1, wherein during agglomerating the recirculated solution has a total copper concentration of 0.2 to 5.0 g/L.

5. A process according to claim 1, wherein during agglomerating the recirculated solution has a ferrous ion concentration of 1.0 to 10.0 g/L.

6. A process according to claim 1, wherein during agglomerating the recirculated solution has a ferric ion concentration of 1.0 to 10.0 g/L.

7. A process according to claim 1, wherein during agglomerating the recirculated solution has a sulphuric acid concentration of 2.0 to 10.0 g/L.

8. A process according to claim 1, wherein during agglomerating the recirculated solution has a chloride ion concentration of 30.0 to 130.0 g/L.

9. A process according to claim 2, wherein during agglomerating the resulting agglomerate has a humidity between 6 to 12% when exiting the agglomeration drum.

10. A process according to claim 1, wherein during curing in the stack the mix of sea water, saline or water, calcium chloride, sulphuric acid and/or the recirculated solution is fed at temperatures higher than 30 degrees Celsius and lower than 60 degrees Celsius forms a solution reaching maximum values of temperature of 70 to 85 degrees Celsius.

11. A process according to claim 1, wherein during curing the solution reach ion chloride concentrations of 140 to 365 g/L.

12. A process according to claim 1, wherein during curing in the pit, energy is added as heat by means of water jackets, electric heaters, hot air, or solar radiation allowing to keep the temperature of the mineral in a range over 30 degrees Celsius and under 60 degrees Celsius.

13. A process according to claim 1, wherein during curing in the pit, the curing period is higher than 3 days.

14. A process according to claim 1, wherein during leaching in the pit, an irrigation period for secondary sulphur is less than 80 days and for primary sulphur is less than 300 days.

15. A process according to claim 1, wherein during washing, the irrigation refinement solution in the stacks is heated at a temperature higher than 30 degrees Celsius and lower than 60 degrees Celsius by a heat exchange operating with a rich solution at the exit of the pit.

16. A process according to claim 1, wherein said process is applied to leach copper sulphurated minerals having primary and/or secondary mineralization of copper.

* * * * *